T. G. GLOVER.
Harvester-Rakes.
No. 158,272.
2 Sheets--Sheet 2
Patented Dec. 29, 1874
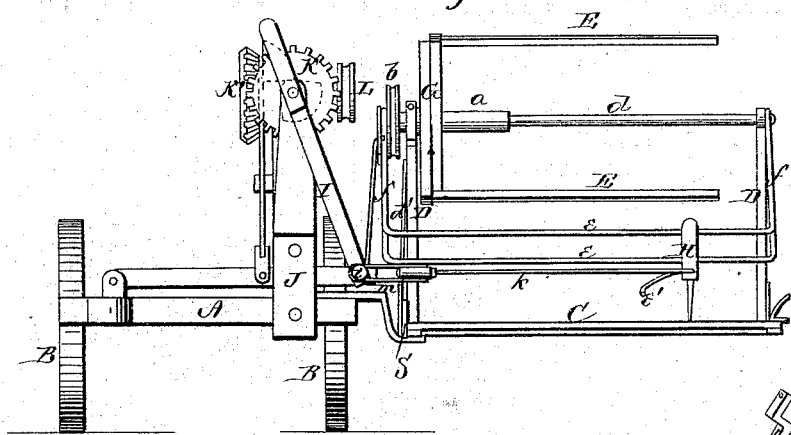
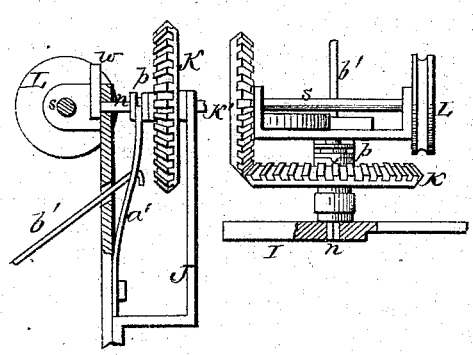
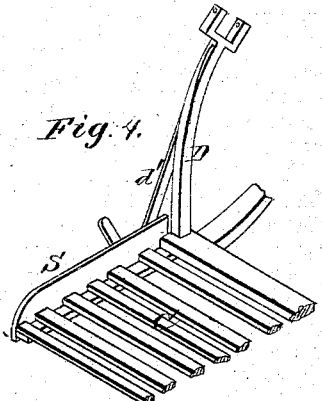
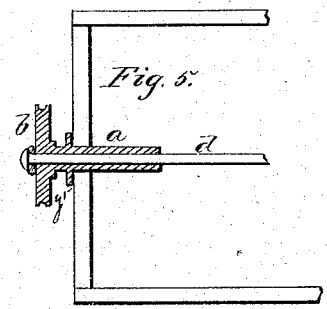
WITNESSES
Henry N. Miller
C. L. Evert.
INVENTOR
Thomas G. Glover
per
Alexander Mason
Attorneys

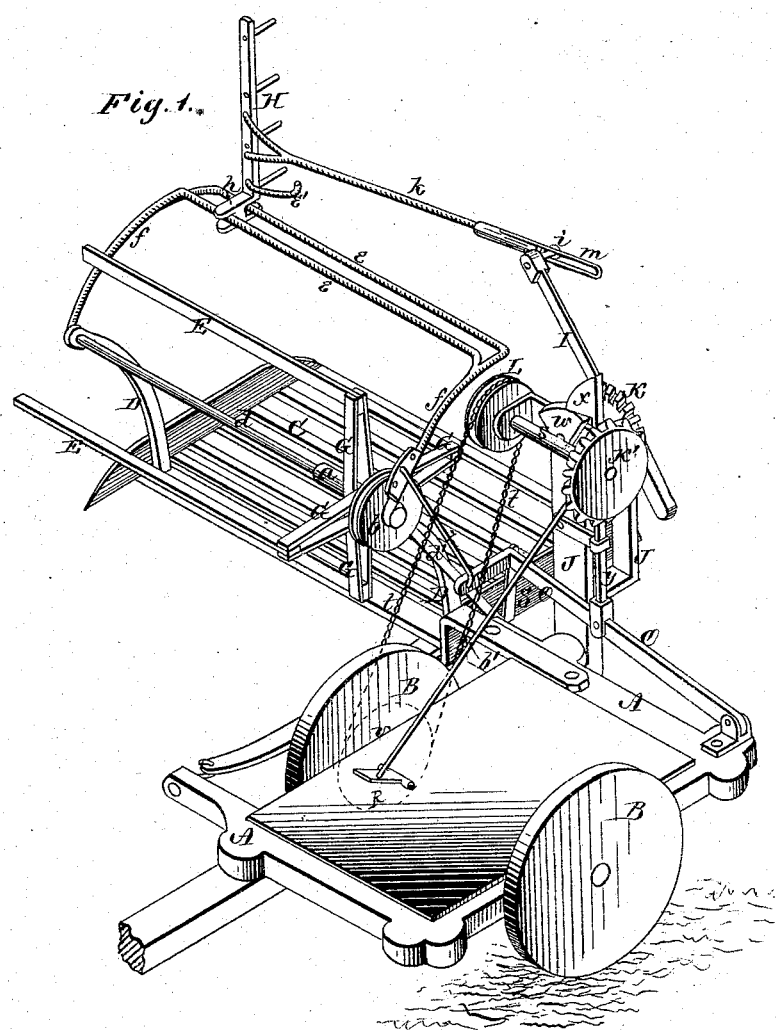

UNITED STATES PATENT OFFICE.

THOMAS G. GLOVER, OF BEDFORD, INDIANA.

IMPROVEMENT IN HARVESTER-RAKES.

Specification forming part of Letters Patent No. 158,272, dated December 29, 1874; application filed October 12, 1874.

*To all whom it may concern:*

Be it known that I, THOMAS G. GLOVER, of Bedford, in the county of Lawrence and in the State of Indiana, have invented certain new and useful Improvements in Harvester-Rakes; and do hereby declare that the following is a full, clear, and exact description thereof, reference being had to the accompanying drawings and to the letters of reference marked thereon, making a part of this specification.

My invention is intended as an improvement on the harvester-rake for which Letters Patent No. 148,947 were granted to me March 24, 1874; and the nature of my invention consists in a movable grain-board, held by a spring at the inner end of the platform; also, in the devices for operating the rake; and in the combination of parts, as will be hereinafter more fully set forth.

In order to enable others skilled in the art to which my invention appertains to make and use the same, I will now proceed to describe its construction and operation, referring to the annexed drawings, in which—

Figure 1 is a perspective view of a harvester-rake embodying my improvements. Fig. 2 is a rear elevation of the same; and Figs. 3, 4, and 5 are detached views of certain parts thereof.

A represents the frame of a harvester, with its wheels B B, and the slat platform C. D D are the reel-posts, rising from each end of the platform C, near the front edge. The reel is constructed of horizontal arms E attached to the ends of cross-bars G, which are fastened on a sleeve, a. Cast with this sleeve, upon its outer end, is a grooved pulley, b, to receive the band or cord which revolves the reel. A flange, y', is also cast with this sleeve, against which the cross-bars G bear, so as to prevent any inward movement of the reel. The sleeve is laid in the end of the inner reel-post D, between the cross-bars G and pulley b, and a stationary rod or shaft, d, is passed through the sleeve and has its bearing for the other end in the end of the outer reel-post. On the ends of the stationary rod or shaft d are pivoted arms f f, which are connected— a suitable distance beyond the reel arms E— by means of two parallel rods e e, forming guides or ways for the rake H to slide upon back and forth, the end of the rake-head being provided with a slotted block, h, fitting between and over the guide-rods e e. From the rake H extends a rod or handle, k, on the end of which is swiveled a link or slotted bar, m. Through this link is passed a headed pin or stud, i, into the end of a crank, I, which is fastened to the rear end of a shaft, n, having its bearings in an upright frame, J, attached to the harvester-frame A. On the shaft n is loosely placed a cog-wheel, K, and a clutch, p, is feathered on the shaft, to be thrown in and out of gear with the cog-wheel K as desired. The cog-wheel K gears with a similar wheel, K', on one end of a shaft, s, which also has its bearings in the frame J, and runs at right angles with the shaft n. On the other end of the shaft p is a pulley, L, connected, by a belt or chain, t, with a pulley, v, on the axle of the harvester, so that the rake will receive its motion from the harvester-axle. Upon the inner end of the shaft n is attached a cam, w, which comes in contact with and operates a cam, x, on the upper end of a rod or bar, y. This rod or bar passes through one or more guides attached to the vertical frame J, and its lower end is coupled or connected to an L-shaped lever, O, which is hinged or pivoted at one end to the harvester-frame A. The other end of the lever O is, by a rod, z, connected with the inner arm f, as shown particularly in Fig. 1. The clutch p is held in gear with the cog-wheel K by means of a spring, a', and this spring is, by a rod, b', connected with a treadle or foot-lever, R, on the harvester, so that the driver can, by putting his foot on said treadle, thow the rake out of gear and stop its movement. S represents the grain-board at the inner end of the platform C, and is attached to, and held in place by, a spring, d'. On the rake H is an arm, e', to push the grain-board S away from the platform and allow the grain to fall off.

The operation of my machine is as follows:

The machine moving forward, the reel is revolved by the ordinary means, and the rake is operated from the pulley v on the harvester-axle by means of the belt or chain t imparting motion to the shaft s, and this, through the cog-wheels K' K and clutch p, to the shaft $n$ and crank I, which latter is connected with the rake. The cam $w$ commences to operate upon the cam $x$ at the instant when the rake has completed its inward movement, and by means of the bar $y$, lever O, and rod $z$ the frame $f\ e$ with the rake is elevated a suitable distance above the platform, and held in this position while the rake, by the means already described, is moved outward. As it completes its outward movement the cam $w$ passes from under the cam $x$, allowing the frame $f\ e$ and rake to fall down, and as the rake moves inward again it collects the cut grain up against the grain-board S until the arm $e'$ on the rake strikes said board, or an arm projecting therefrom, and pushes the grain-board away from the platform and allows the rake to deposit the grain in a gavel or bundle, to be afterward bound. The size of such shock or bundle is easily regulated by the driver, as he can by means of the foot-lever R stop the motion of the rake when it is in an elevated position, and thus allow any desired amount of grain to be cut and fall on the platform before the rake descends to rake it off.

I am aware that a yielding grain-board is not new; hence I do not broadly claim such as my invention.

Having thus fully described my invention, what I claim as new, and desire to secure by Letters Patent, is—

1. The combination, with the rake H and frame $f\ e$, of the rod $z$, lever O, rod $y$ with cam $x$, and the revolving cam $w$, all substantially as and for the purposes herein set forth.

2. The handle $k$, swiveled link $m$, crank I, gearing K' K, pulley L, chain $t$, and pulley $v$ on the axle, in combination with the rake H, frame $f\ e$, rod $z$, lever O, rod $y$ with cam $x$, and and the revolving cam $w$, all substantially as and for the purposes set forth.

3. In combination with the platform C and rake H with arm $e'$, the yielding grain-board S suspended from the reel-post by means of the spring $d'$, substantially as and for the purposes herein set forth.

In testimony that I claim the foregoing I have hereunto set my hand and seal this 19th day of September, 1874.

THOMAS G. GLOVER. [L. S.]

Witnesses:
   JOHN W. COSNER,
   SAMUEL JUDAH.